(12) United States Patent
Duecker-Schulz et al.

(10) Patent No.: US 9,638,244 B2
(45) Date of Patent: May 2, 2017

(54) AXIAL BEARING ARRANGEMENT

(71) Applicant: BorgWarner Inc., Auburn Hills, MI (US)

(72) Inventors: Thomas Duecker-Schulz, Nue-Bamberg (DE); Thomas Koerner, Recklinghausen (DE)

(73) Assignee: BorgWarner Inc., Auburn Hills, MI (US)

( * ) Notice: Subject to any disclaimer, the term of this patent is extended or adjusted under 35 U.S.C. 154(b) by 7 days.

(21) Appl. No.: 14/398,137

(22) PCT Filed: Apr. 29, 2013

(86) PCT No.: PCT/US2013/038580
§ 371 (c)(1),
(2) Date: Oct. 31, 2014

(87) PCT Pub. No.: WO2013/169505
PCT Pub. Date: Nov. 14, 2013

(65) Prior Publication Data
US 2015/0131931 A1    May 14, 2015

(30) Foreign Application Priority Data
May 8, 2012    (DE) ........................ 10 2012 009 147

(51) Int. Cl.
*F16C 27/06*    (2006.01)
*F16C 17/08*    (2006.01)
(Continued)

(52) U.S. Cl.
CPC .............. *F16C 17/08* (2013.01); *F01D 25/16* (2013.01); *F01D 25/168* (2013.01);
(Continued)

(58) Field of Classification Search
CPC ...... F16C 17/04; F16C 17/042; F16C 17/045; F16C 17/047; F16C 17/26; F16C 33/1075;
(Continued)

(56) References Cited

U.S. PATENT DOCUMENTS 4,453,837 A * 6/1984 Shimizu .............. F16C 33/1075
384/121
4,479,728 A * 10/1984 Miller ................. F16C 33/1075
384/369

(Continued)

OTHER PUBLICATIONS

International Search Report in International Application No. PCT/US2013/038580 dated Aug. 21, 2013.

*Primary Examiner* — James Pilkington
(74) *Attorney, Agent, or Firm* — A. Michael Tucker; Stephan A. Pendorf; Patent Central LLC

(57) ABSTRACT

A hydrodynamic axial bearing is provided with segments arranged on a circular ring on axial bearings, wherein a plurality of pressure fields are built up. The length of the individual segments is defined in the circumferential direction, between a first edge and a second edge. The first edge delimits the wedge surface of the segments. In fast-rotating bearings, the ratio of segment width to segment length has a decisive influence on the attainable load-bearing capacity and resulting friction losses. The load-bearing capacity and friction losses are improved by increasing the segment length more intensely with increasing radius. The first edge does not run straight but rather has steps, is arcuate or has linear portions with different gradients.

7 Claims, 6 Drawing Sheets

(51) Int. Cl.
*F16C 17/04* (2006.01)
*F16C 17/10* (2006.01)
*F16C 33/10* (2006.01)
*F01D 25/16* (2006.01)

(52) U.S. Cl.
CPC .......... *F16C 17/045* (2013.01); *F16C 17/047* (2013.01); *F16C 17/107* (2013.01); *F16C 33/107* (2013.01); *F05D 2220/40* (2013.01); *F05D 2240/52* (2013.01); *F16C 2360/24* (2013.01)

(58) Field of Classification Search
CPC .. F16C 33/1085; F16C 2360/23; F16C 33/24; F16C 17/08; F16C 17/107; F02C 7/06; F01D 25/166; F01D 25/168; F01D 25/16
See application file for complete search history.

(56) References Cited

U.S. PATENT DOCUMENTS

| | | | |
|---|---|---|---|
| 5,178,471 A | 1/1993 | Roessler | |
| 6,024,495 A | 2/2000 | Loos et al. | |
| 6,036,435 A * | 3/2000 | Oklejas | F16C 33/1075 415/106 |
| 6,669,372 B1 | 12/2003 | Martin | |
| 8,672,610 B2 * | 3/2014 | Berger | F01D 25/16 415/104 |
| 2010/0129212 A1 | 5/2010 | Berger et al. | |
| 2014/0044540 A1 * | 2/2014 | Uneura | F16C 33/1075 415/229 |
| 2015/0086144 A1 * | 3/2015 | Moscetti | F16C 33/1085 384/282 |

* cited by examiner

AXIAL BEARING ARRANGEMENT

BACKGROUND OF THE INVENTION

Field of the Invention

The invention relates to an axial bearing arrangement for a rotating shaft, in particular of a turbocharger. In particular, the invention relates to an axial bearing arrangement for the rotating shaft between a compressor wheel and a turbine wheel of an exhaust-gas turbocharger.

Description of the Related Art

The use of segments arranged on a circular ring on axial bearings, in particular hydrodynamic axial bearings, is known from the prior art. Here, the shaft is "braced" or supported through the use of the segments in the housing, wherein a plurality of pressure fields are built up and the rotor is mounted in the axial direction.

It is therefore an object of the present invention to specify an axial bearing arrangement which, while being inexpensive to produce and assemble, permits operationally reliable mounting, in particular of a shaft in a turbocharger. By means of the invention, it is possible, using structurally identical axial bearings within a turbocharger type series, for the different, application-specific axial thrust loads to be accommodated only by exchanging the run-on collars (sealing bushing, bearing collar). By means of correspondingly adapted load-bearing surfaces of the run-on collars, it is possible, with the same segment configuration on both sides on the axial bearing, for different forces to be accommodated in each thrust direction. It is the distinctive feature that, despite different contact diameters, the width/length ratio remains approximately constant for a wide variety of adaptations. By means of said design measures, it was simultaneously possible to achieve the aim of reducing the resulting friction losses.

BRIEF SUMMARY OF THE INVENTION

This object is achieved by the features of the independent claims. The dependent claims contain advantageous developments of the invention.

The segment geometry is normally made up of wedge and rest surfaces, the wedge generates a narrowing lubrication gap which ensures the hydrodynamic load-bearing capacity during operation. Geometries without a wedge are also possible, such as for example that in the stepped axial bearing.

The object is thus achieved by means of an axial bearing arrangement. The shaft to be mounted defines the axial direction. The radius is measured perpendicular to said axial direction. The circumferential direction extends perpendicular to the radius and perpendicular to the axial direction. The length of the individual segments is defined in the circumferential direction and thus denotes an arc length. The individual segments are delimited in the circumferential direction by a first edge and a second edge. The first edge is in particular the edge which delimits the wedge surface of the segments.

The segment length extends between said two edges. The width of the segments is measured in the direction of the radius.

In the case of conventional segments, the segment length does not increase at all, or increases only very slowly, with increasing radius. This results, in the case of conventional segments with increasing diameter, in an increase in the ratio of segment width and segment length. It has been identified according to the invention that, in the case of fast-rotating bearings, the ratio of segment width to segment length has a decisive influence on the attainable load-bearing capacity and resulting friction losses. It has thus been identified that the load-bearing capacity and friction losses can be improved if the segment length increases more intensely with increasing radius, in order that the ratio of segment width to segment length remains constant with increasing radius, by contrast to present configurations. Here, the segment geometry is configured on the basis of the axial thrust loads to be expected and thus the load-bearing surface gradations of the run-on collars. For said configuration, it is defined that the first edge does not run straight but rather has steps, is arcuate or has linear portions with different gradients.

It is particularly preferably provided that both the wedge length and also the rest length increase with increasing radius. For further optimization of the load-bearing capacity and of the friction losses, it has been identified in tests that the ratio of rest length to wedge length should vary as little as possible over the radius. It is thus preferably defined that a ratio of rest length to wedge length is at most 0.5, and is preferably 0.25, over an entire segment width.

BRIEF DESCRIPTION OF THE SEVERAL VIEWS OF THE DRAWINGS

Further details, advantages and features of the present invention become apparent from the following description of exemplary embodiments with reference to the drawing, in which.

DETAILED DESCRIPTION OF THE INVENTION

Embodiments of the axial bearing arrangement 11 according to the invention will be described below with reference to FIGS. 1 to 11.

Figure 1:
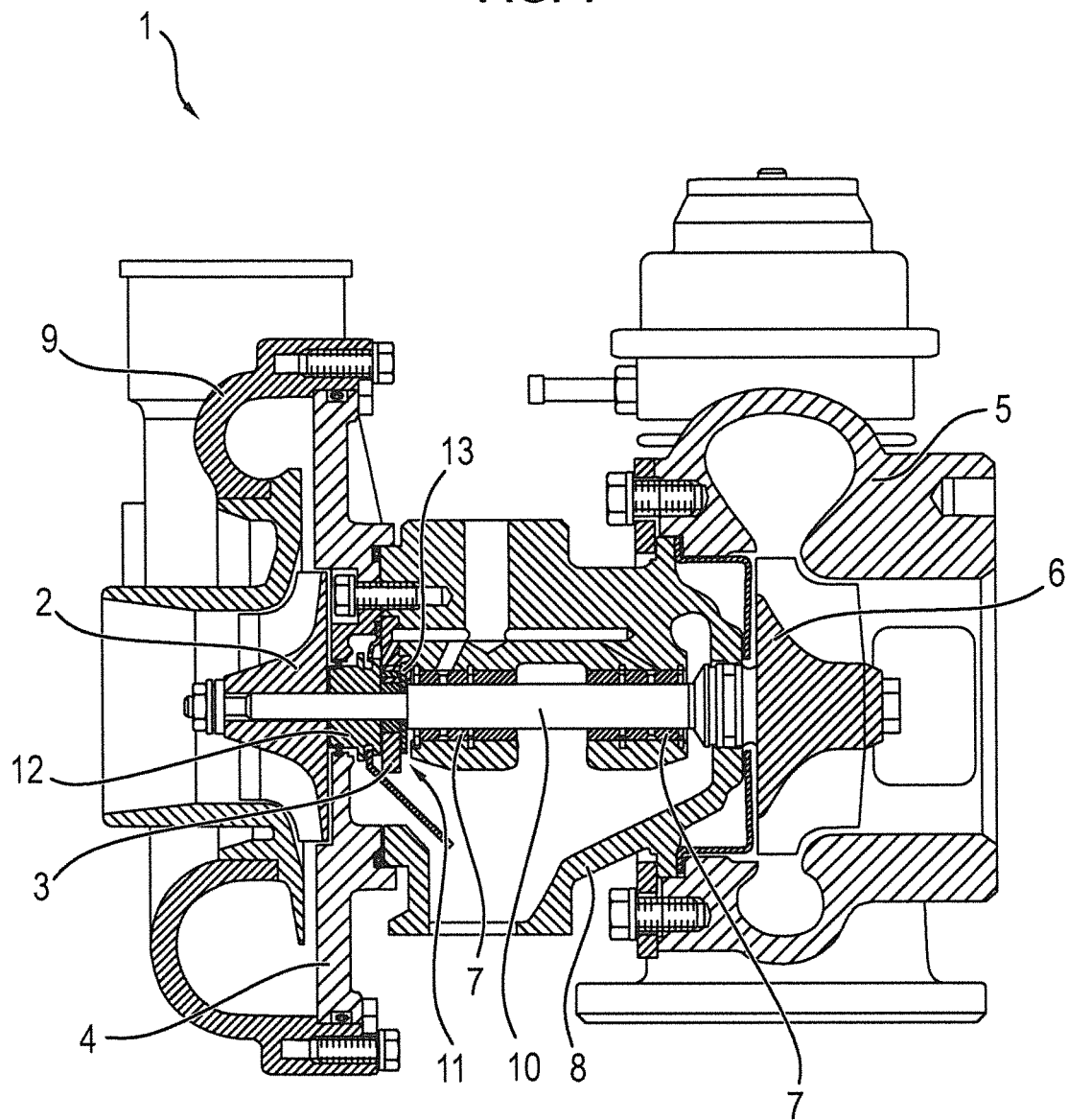
FIG. 1 is a schematically slightly simplified sectional illustration of an exhaust-gas turbocharger having an axial bearing arrangement according to the invention as per a first and second exemplary embodiment.

FIG. 1 is a schematically slightly simplified sectional illustration of an exhaust-gas turbocharger 1. The exhaust-gas turbocharger 1 comprises a turbine housing 5 and a compressor housing 9. The turbine housing 5 and the compressor housing 9 are connected to one another by means of a bearing housing 8. The turbine-side termination of the compressor housing 9 is formed by a compressor rear wall 4. A compressor wheel 2 is situated in the compressor housing 9. A turbine wheel 6 is situated in the turbine housing 5. The compressor wheel 2 and the turbine wheel 6 are arranged rotationally conjointly on the shaft 10. The shaft 10 is mounted radially in the bearing housing 8 by means of bearing bushings 7. For the axial mounting of the shaft 10, the axial bearing arrangement 11 is provided in the bearing housing 8. The turbine wheel 6 is set in rotation by means of an exhaust-gas flow of an internal combustion engine. The compressor wheel 2 is thereby likewise set in rotation via the shaft 10. The charge air of the internal combustion engine is supercharged by means of the compressor wheel 2.

Figure 2:
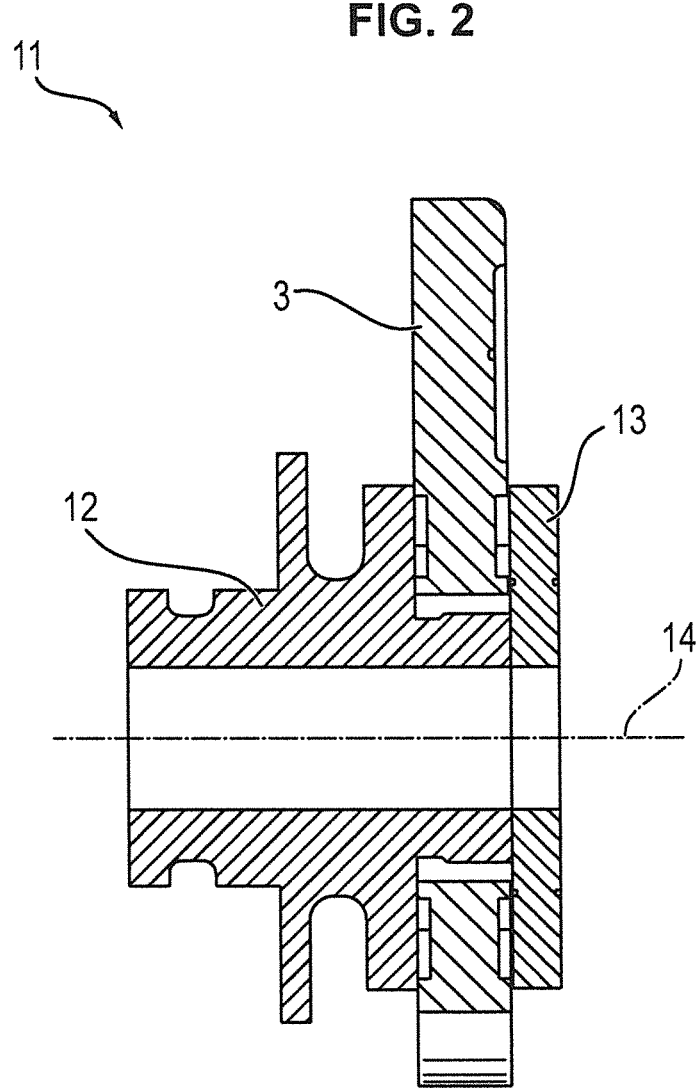
FIG. 2 shows a sectional view of the axial bearing arrangement according to the invention as per the first and second exemplary embodiment.

FIG. 2 is a sectional illustration of the axial bearing arrangement 11 for both exemplary embodiments. The axial bearing arrangement 11 comprises an axial bearing 3, a sealing bushing 12 and a bearing collar 13. For simplified illustration, the shaft 10 is no longer shown here, with only the axis 14 of the shaft 10 being shown. The sealing bushing 12 and the bearing collar 13 are also referred to within this application as "run-on collars" for simplicity. The sealing bushing 12 and the bearing collar 13 are seated rotationally conjointly on the shaft 10. The axial bearing 3 is braced rotationally fixedly in the housing, in particular in the bearing housing 8. The embodiment of the axial bearing 3 on the side facing toward the bearing collar 13 will be described below. The opposite side of the axial bearing 3, and the surface, which bears at the face side against the axial bearing 3, of the sealing bushing 12, are however likewise configured in a corresponding way as an axial bearing arrangement.

Figure 3:
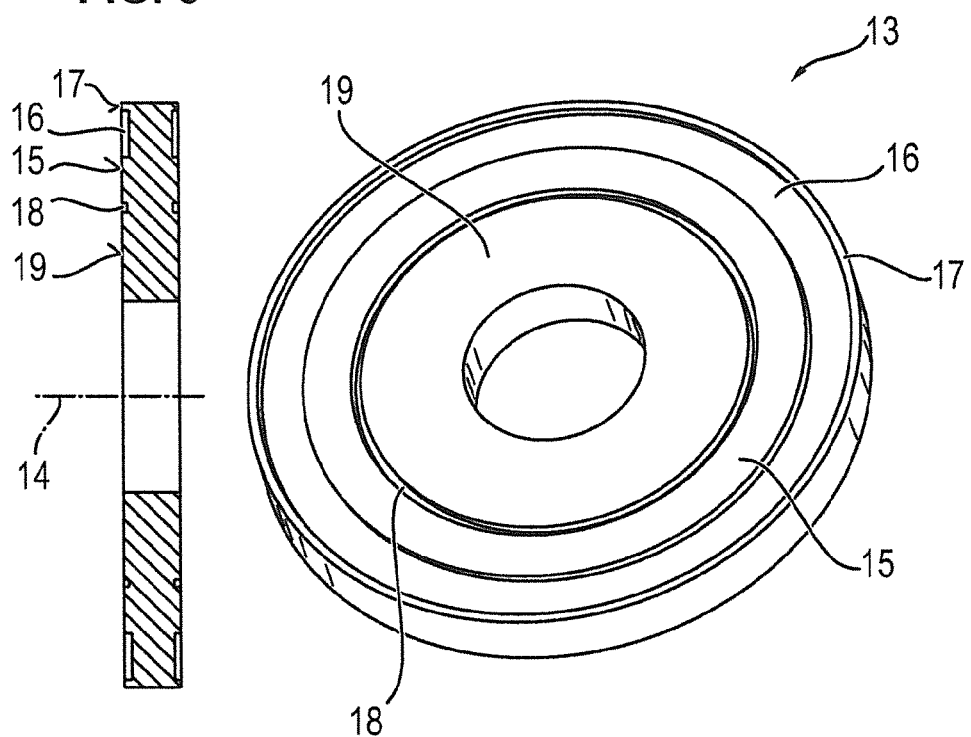
FIG. 3 shows two different views of a run-on collar of the axial bearing arrangement according to the invention as per the first exemplary embodiment.
Figure 4:
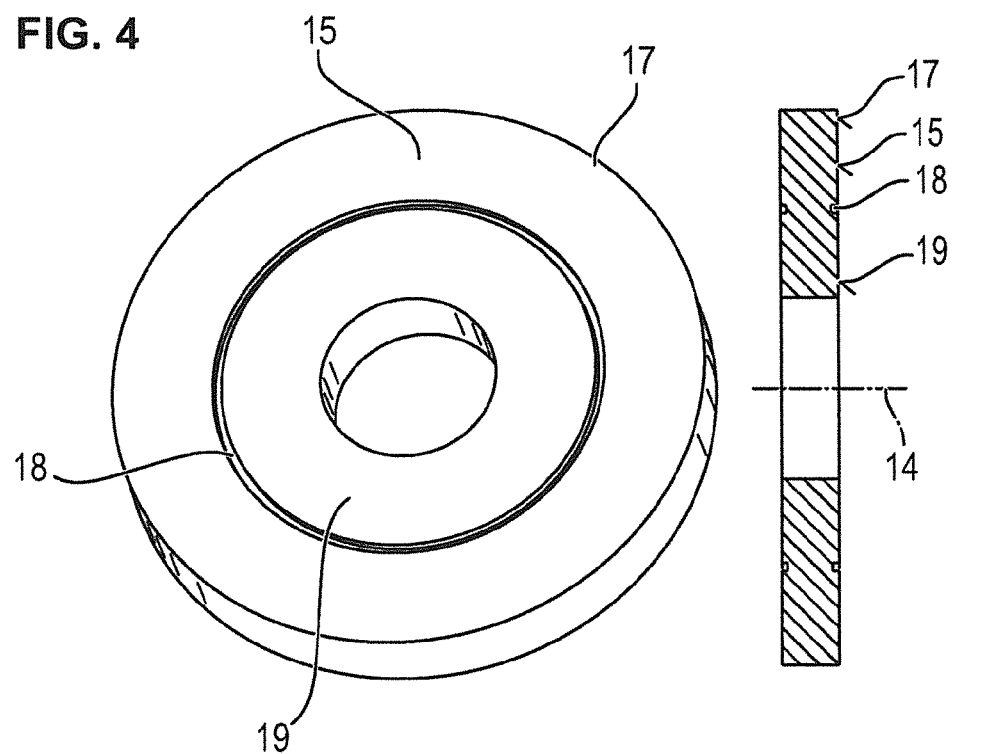
FIG. 4 shows two different views of a run-on collar of the axial bearing arrangement according to the invention as per the second exemplary embodiment.

FIG. 3 shows the bearing collar 13 as per the first exemplary embodiment. FIG. 4 shows the bearing collar 13 as per the second exemplary embodiment. Identical or functionally identical parts are denoted by the same reference numerals in all of the exemplary embodiments. FIGS. 3 and 4 show in each case a plan view and a sectional view of the bearing collar 13.

The bearing collar 13 comprises a load-bearing surface 15 at least on its side facing toward the axial bearing 3. A first encircling groove 16 is situated radially to the outside of said load-bearing surface 15. An annular first sealing surface 17 is arranged radially to the outside of the first encircling groove 16. A second encircling groove 18 is situated radially to the inside of the load-bearing surface 15. A third sealing surface 19 is situated radially to the inside of the second groove 18. An embodiment is also conceivable without a second groove 18, such that the load-bearing surface merges directly into the sealing surface at the inner diameter.

In the second exemplary embodiment according to FIG. 4, the load-bearing surface 15 is designed to be larger, such that the first groove 16 is omitted and the load-bearing surface 15 merges directly into the first sealing surface 17.

It is in particular the case that the first sealing surface 17, the third sealing surface 19 and the load-bearing surface 15 are in alignment as viewed in the radial direction.

Figure 5:
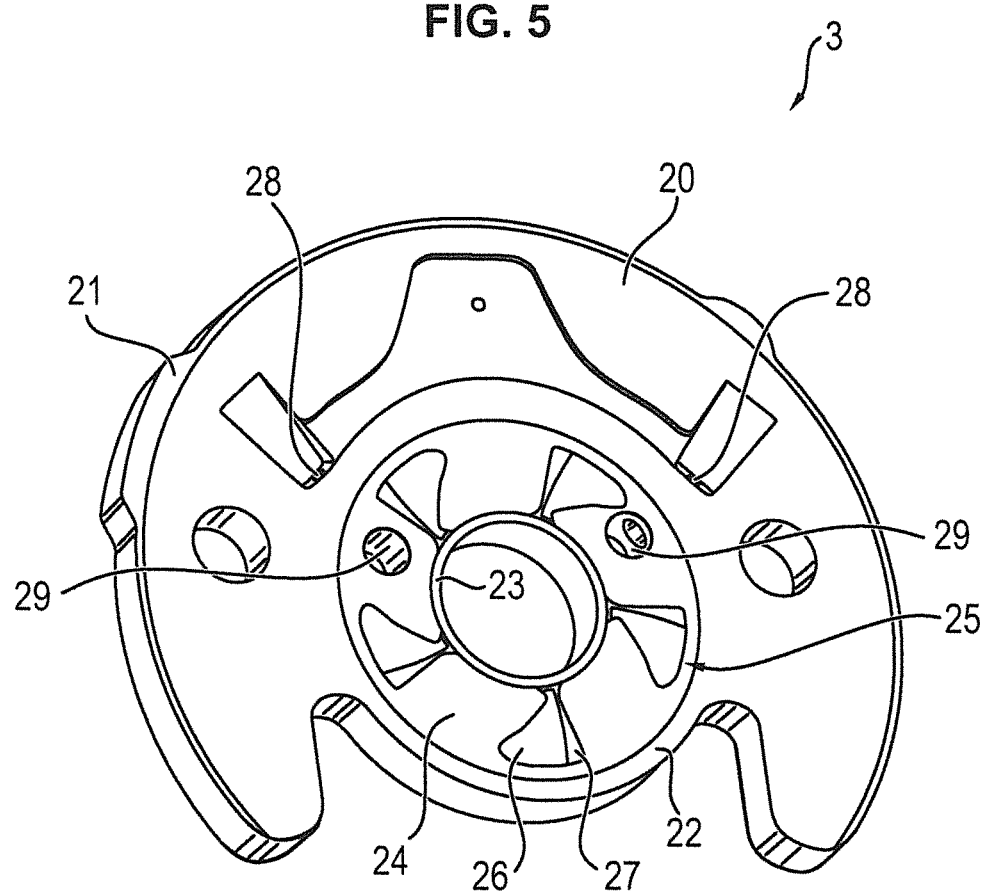
FIG. 5 shows an axial bearing of the axial bearing arrangement according to the invention as per the first and second exemplary embodiment.

FIG. 5 shows the axial bearing 3 as per the first and second exemplary embodiment.

The axial bearing 3 comprises a carrier 20. Said carrier 20 is mounted in the housing of the turbocharger 1. Here, the position of the carrier 20 in the housing is defined by means of the lugs 21. Furthermore, the axial bearing 3 comprises, on the carrier 20, an annular second sealing surface 22 and an annular fourth sealing surface 23. In the assembled state, the second sealing surface 22 is situated opposite the first sealing surface 17. The fourth sealing surface 23 is situated opposite the third sealing surface 19.

A recessed annular segment receptacle 24 is situated on the carrier 20 between the second sealing surface 22 and the fourth sealing surface 23. The second sealing surface 22 and the fourth sealing surface 23 are elevated in relation to said annular segment receptacle 24 and the rest surfaces of the segments preferably lie in a plane. A plurality of segments 25 are situated on the annular segment receptacles 24. The segments 25 are in particular distributed uniformly along the circumference. Each of the segments 25 comprises a wedge surface 26 and a rest surface 27. In the rest state of the axial bearing arrangement 11, the load-bearing surface 15 of the bearing collar 13 can bear against said segments 25, in particular against the rest surfaces 27.

FIG. 5 furthermore shows two oil supply bores 28 and two oil distributing bores 29. The oil distributing bores 29 are formed as passage bores and thus distribute the oil between the two annular segment receptacle surfaces 24 on the two sides of the axial bearing 3. The oil supply bores 28 extend in the radial direction and open out in each case in an oil distributing bore 29. The oil distributing bores need not imperatively be circular.

The sealing bushing 12 is supported on the opposite side (not illustrated) of the axial bearing 3. Said opposite side is, in the region of the segments, of analogous design to the side oriented in the direction of the bearing collar, though it is self-evidently possible for the oil pocket to be omitted.

Figure 6:
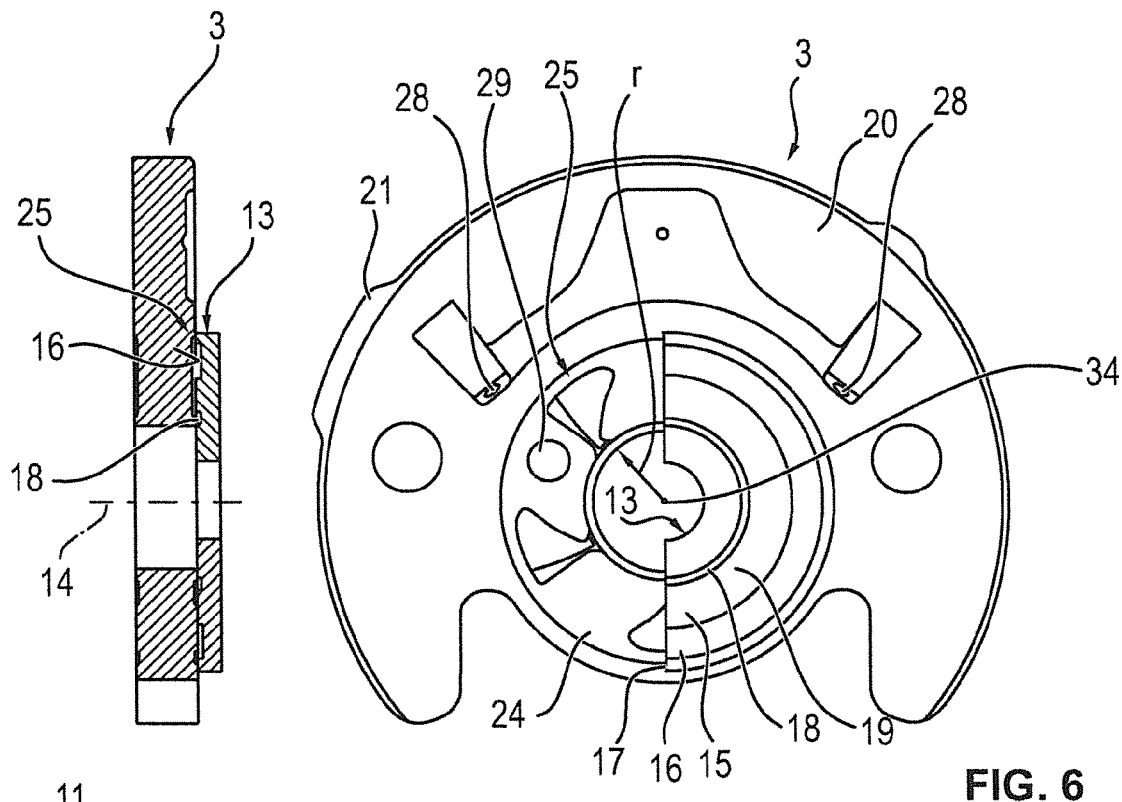
FIG. 6 shows the axial bearing arrangement according to the invention in two different illustrations as per the first exemplary embodiment.
Figure 7:
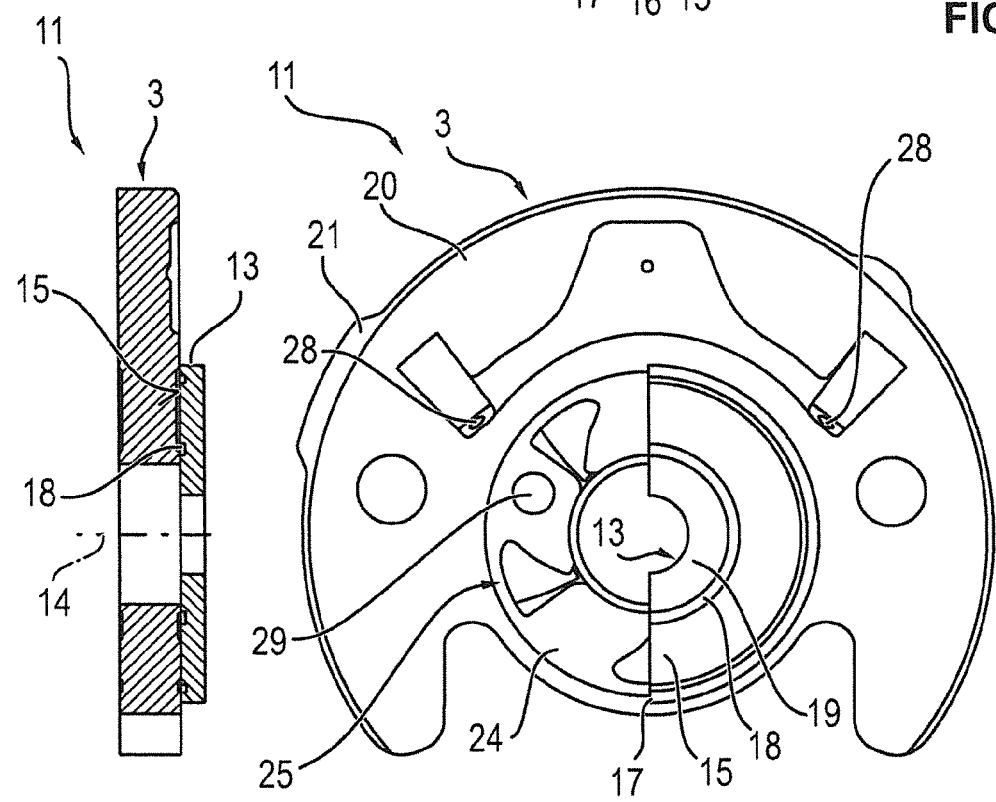
FIG. 7 shows the axial bearing arrangement according to the invention in two different illustrations as per the second exemplary embodiment.

FIGS. 6 and 7 show the assembled state of the axial bearing arrangement 11 with axial bearing 3 and bearing collar 13 (run-on collar). Both figures show a plan view and a sectional side view of the axial bearing arrangement 11. Here, in each case only half of the bearing collar 13 is illustrated. Again, for clarity, the shaft 10 is not shown, and only the axis 14 of the shaft 10 is indicated. FIG. 6 shows the first exemplary embodiment, and FIG. 7 shows the second exemplary embodiment. It is in particular the case that at least both exemplary embodiments are used within the turbocharger type series according to the invention. Further gradations of the load-bearing surface on the run-on collars may be realized as a function of the axial thrust loads arising in an application.

A first width 30 of the load-bearing surface 15 measured in the radial direction is plotted in FIG. 6. FIG. 6 also shows a second width (segment width) 31 of the segments 25, likewise measured in the radial direction. In said exemplary embodiment, the first width 30 is smaller than the second width 31. The load-bearing surface 15 thus does not overlap the segments 25 completely as viewed in the axial direction.

FIG. 7 shows the axial bearing arrangement 11 from the same type series but for accommodating a higher axial force. Here, the load-bearing surface 15 is designed to be very much larger, and overlaps the segments 25 completely.

FIGS. 8 to 11 show various embodiments of the individual segments 25 as they are used in the two exemplary embodiments.

The individual segments 25 are in each case made up of a wedge surface 26 and a rest surface 27. The wedge surface 26 is delimited by a first edge 36. The rest surface 27 is delimited by a second edge 37. The segments 25 have a segment length 35 measured in the circumferential direction. Said segment length is made up of a wedge length 32 and a rest length 33. The segments 25 have a segment width 31 measured in the direction of the radius r.

Figure 8:
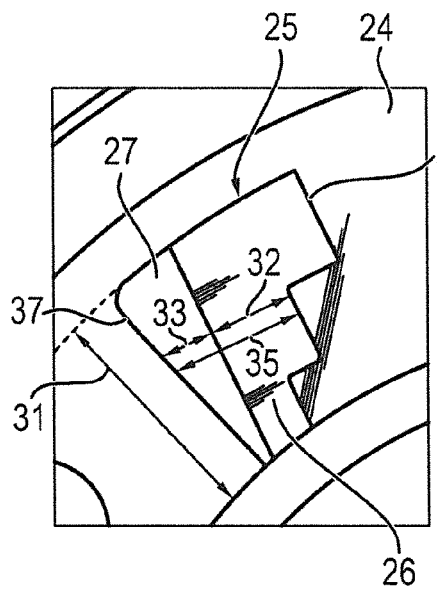
FIGS. 8-11 show various embodiments of segments of the axial bearing arrangement according to the invention as per the first and second exemplary embodiment.
Figure 9:
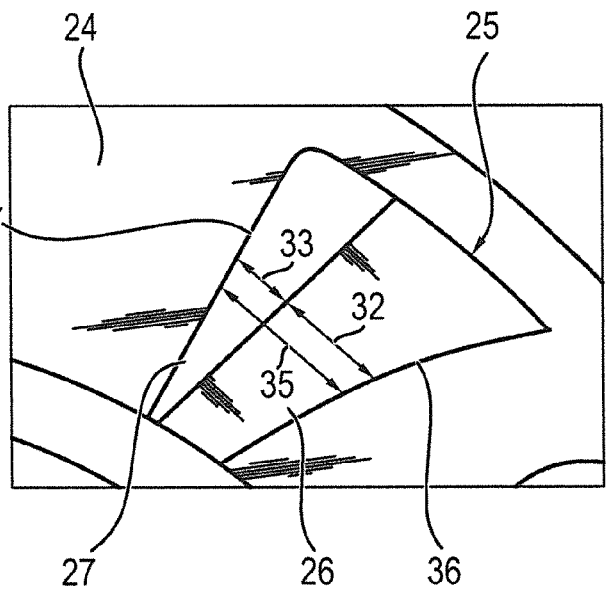

In FIG. 8, the profile of the first edge 36 has two steps. In FIG. 9, the first edge 36 runs in arcuate form, such that here, the segment length 35 increases more intensely than if the first edge 36 ran linearly.

Figure 10:
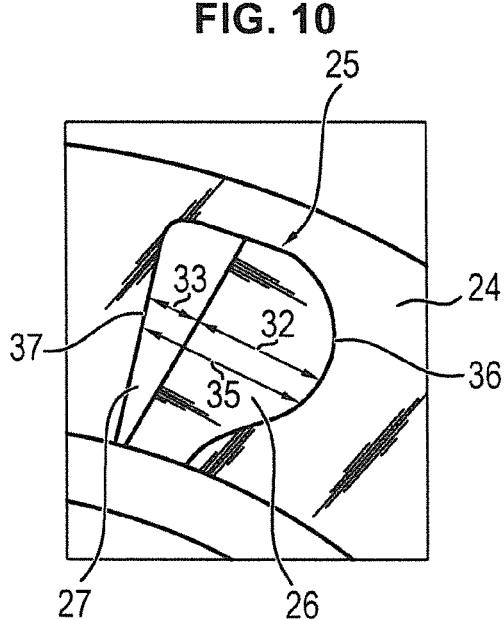

In FIG. 10, the first edge 36 is formed with different curvatures. This yields a first region of the first edge 36, in which first region the first edge 36 is curved such that the segment length 35 increases.

Figure 11:
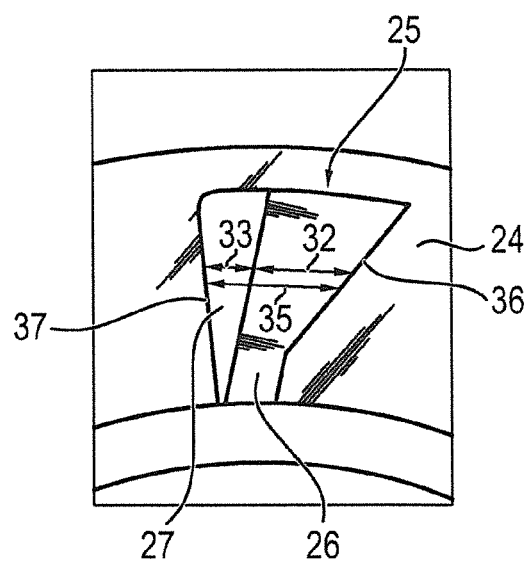

FIG. 11 shows a first edge 36 with two linear portions with different gradient. Here, in a radially outer region of the segment 25, the first edge 36 is inclined more steeply, such that the segment length 35 increases more intensely here.

In the axial bearing arrangement 11, the oil is introduced to the pockets at the outer side of the oil supply bores 28. The oil passes to both sides of the axial bearing 3 via said oil supply bores 28 and the oil distributing bores 29. In order that the oil cannot flow out directly, the oil chamber between the sealing bushing 12 and the bearing collar 13 is sealed off in the inward and outward directions. By means of said type of oil supply, the oil is delivered directly to the locations at which it is required and is simultaneously prevented from flowing out directly. The direct supply of oil to both sides is advantageous. Sufficient oil is thus available at all times, regardless of the thrust load direction. At the same time, in relation to embodiments in which the oil is supplied via a bore to the rotating component, splashing losses and therefore also friction losses are considerably reduced. By means of the abovementioned sealing surfaces which are embodied in particular as sealing rings, it is possible for oil to be retained in the axial bearing even after a shutdown of the engine, which oil is then directly available upon a restart of the engine.

The variability with regard to load-bearing capacity with a single axial bearing 3 for different turbochargers of a turbocharger type series is advantageous. The axial bearing 3 is constructed with a certain number of segments 25 with optimum width/length ratios. The wedge surfaces 26 may be of stepped or stepless design in terms of wedge length 32. The size and number of segments is configured with regard to the maximum thrust load expected for the respective type series. The maximum load-bearing capacity of the axial bearing 3 is attained in the case of maximum overlap with the load-bearing surfaces of the run-on collars (sealing bushing 12 and bearing collar 13). If a low axial thrust load is expected in an application, the area of overlap between the load-bearing surface 15 and the segments 25 can be reduced. By combining different areas of overlap and/or different segments 25, it is possible to react to the different axial thrust loads in each thrust load direction. If the thrust load direction is considerably lower in one direction than in the other direction, the areas of overlap should be configured correspondingly, as a result of which in turn the friction losses are reduced.

In the different turbochargers of the type series, both the inner and the outer diameter of the corresponding run-on collar remain unchanged. Only the overlap with the segments 25 is varied. The larger the area of overlap with the segments 25 is, the larger the load-bearing surface and thus the load-bearing capacity are. The outer encircling groove (first groove 16) minimizes the sealing surface area required for the pressurized supply, and thus the friction losses.

The invention may self-evidently be implemented not only in the combination described here, composed of sealing bushing, axial bearing and bearing collar, but rather also for example for split axial bearings or bearing bushings into which the axial bearing is integrated.

Said hydrodynamically acting surface is preferably of wedge-shaped form, though other forms such as spherical, stepped or undulating are also possible.

The segment geometry may also be of mirror-inverted form in relation to the examples specified above. That is to say, the second edge does not run straight but rather correspondingly runs in a variable manner.

In addition to the above written description of the invention, reference is hereby explicitly made to the diagrammatic illustration of the invention in FIGS. 1 to 11 for additional disclosure thereof.

In the present invention, it is preferable in the case of different axial bearing arrangements, in particular within a type series, for the axial bearing not to be changed; instead, the size of the load-bearing surface of the run-on collar is adapted. It is thus preferable for the following arrangements and methods to be provided, in particular in combination with the above-described embodiment of the segments 25:

a) Axial bearing arrangement (11) for a rotating shaft (10), in particular of a turbocharger (1), having
   a non-rotating axial bearing (3),
   a plurality of in particular wedge-shaped segments (25) which project from, are recessed into or are flush with the non-rotating axial bearing (3) in the axial direction, and
   a run-on collar (12, 13) which is rotationally conjointly connected to the shaft (10),
   wherein the run-on collar (12, 13) comprises an annular load-bearing surface (15) on the end side facing toward the axial bearing (3),
   wherein the load-bearing surface (15), at least in the rest position of the axial bearing arrangement (11), can bear against the segments (25), and
   wherein the load-bearing surface (15) only partially overlaps the segments (25) as viewed in the axial direction.

b) Axial bearing arrangement according to point a), wherein the run-on collar (12, 13) is a bearing collar (13) rotationally conjointly connected to the shaft or is a sealing bushing (12) rotationally conjointly connected to the shaft.

c) Axial bearing arrangement according to one of the preceding points, wherein a first width (30) of the load-bearing surface (15) measured in the radial direction on the run-on collar is smaller than a second width (31) of the segments (25) measured in the radial direction.

d) Axial bearing arrangement according to one of the preceding points, comprising a first encircling groove (16) on that end side of the run-on collar (12, 13) which faces toward the axial bearing (3), wherein the first groove (16) is arranged radially to the outside of the load-bearing surface (15) and so as to directly adjoin the load-bearing surface (15).

e) Axial bearing arrangement according to point d), wherein the run-on collar (12, 13) comprises an annular first sealing surface (17) radially to the outside of the first groove (16), wherein the first sealing surface (17) is situated opposite a second annular sealing surface (22), situated radially to the outside of the segments (25), on the axial bearing (3).

f) Axial bearing arrangement according to one of the preceding points, comprising a second encircling groove (18) on that end side of the run-on collar (12, 13) which faces toward the axial bearing (3), wherein the second groove (18) is arranged radially to the inside of the load-bearing surface (15) and so as to directly adjoin the load-bearing surface (15).

g) Axial bearing arrangement according to point f), wherein the run-on collar (12, 13) comprises an annular third sealing surface (19) radially to the inside of the second groove (18), wherein the third sealing surface (19) is situated opposite a fourth sealing surface (23), situated radially to the inside of the segments (25), on the axial bearing (3).

h) Turbocharger type series comprising at least two turbochargers (1) with in each case one axial bearing arrangement (11) for a rotating shaft (10), wherein the axial bearing arrangement (11) comprises
a fixed axial bearing (3),
a plurality of segments (25) which project from, are recessed into or are flush with the axial bearing (3) in the axial direction, and
in each case one run-on collar (12, 13) which is rotationally conjointly connected to the shaft (10).
wherein the run-on collar (12, 13) comprises an annular load-bearing surface (15) on the side facing toward the axial bearing (3),
wherein the load-bearing surface (15), in the rest position of the axial bearing arrangement (11), can bear against the segments (25),
wherein a size of the load-bearing surface (15) on the run-on collar (12, 13) differs in the at least two turbochargers (1), and
wherein the axial bearing (3) and the segments (25) are structurally identical in the at least two turbochargers (1).

i) Turbocharger type series according to point h), wherein the number of segments (25) is identical in the at least two turbochargers (1).

j) A method for producing a turbocharger type series comprising at least two turbochargers (1) with in each case one axial bearing arrangement (11) for a rotating shaft (11), wherein the axial bearing arrangement (11) comprises
a fixed axial bearing (3),
a plurality of segments (25) which project from, are recessed into or are flush with the axial bearing (3) in the axial direction, and
in each case one run-on collar (12, 13) which is rotationally conjointly connected to the shaft (10),
wherein the run-on collar (12, 13) comprises an annular load-bearing surface (15) on the side facing toward the segments (25),
wherein the load-bearing surface (15), at least in the rest position of the axial bearing arrangement (11), can bear against the segments (25),
wherein structurally identical axial bearings (3) and structurally identical segments (25) are used in the at least two turbochargers (1), and
wherein in each case a size of the load-bearing surface (15) on the run-on collar (12, 13) is configured in accordance with the demands on the axial bearing arrangement (11) in the at least two turbochargers (1).

LIST OF REFERENCE SIGNS

| | |
|---|---|
| 1 | Exhaust-gas turbocharger |
| 2 | Compressor wheel |
| 3 | Axial bearing |
| 4 | Compressor rear wall |
| 5 | Turbine housing |
| 6 | Turbine wheel |
| 7 | Radial bearing bushing |
| 8 | Bearing housing |
| 9 | Compressor housing |
| 10 | Shaft |
| 11 | Axial bearing arrangement |
| 12 | Sealing bushing |
| 13 | Bearing collar |
| 14 | Axis of the shaft 10 |
| 15 | Load-bearing surface |
| 16 | First groove |
| 17 | First sealing surface |
| 18 | Second groove |
| 19 | Third sealing surface |
| 20 | Carrier |
| 21 | Lug |
| 22 | Third sealing surface |
| 23 | Fourth sealing surface |
| 24 | Annular segment receptacle |
| 25 | Segment |
| 26 | Wedge surface |
| 27 | Rest surface |
| 28 | Supply bore |
| 29 | Oil distributing bore |
| 30 | First width |
| 31 | Second width (Segment width) |
| 32 | Wedge length |
| 33 | rest length |
| 34 | Center of the shaft |
| 35 | Segment length |
| 36 | First edge |
| 37 | Second edge |
| α | Central point angle |

The invention claimed is:

1. An axial bearing arrangement (11) for a rotating shaft (10) which extends in an axial direction, comprising
a non-rotating axial bearing (3) having a bearing surface (24), having a plurality of surface segments (25) which are distributed along the circumferential direction and which project from or are recessed into the bearing surface (24) of the axial bearing (3) in the axial direction, and
a run-on collar (12, 13) which is rotationally conjointly connected to the shaft (10), wherein the run-on collar (12, 13) comprises an annular load-bearing surface (15) for support on the segments (25) of the axial bearing,
wherein the segments (25) are delimited, with respect to the direction of rotation of the rotating shaft (10) and run-on collar (12, 13), by in each case one first edge (36) and one second edge (37), wherein a segment length (35) is defined as an arc length between the first and second edges (36, 37) in the circumferential direction, wherein a radius (r) is defined perpendicular to the axial direction to the central point (34) of the shaft (10), and wherein each segment has a segment width (31) delimited by a radially inner edge and a radially outer edge, and
wherein the segment length (35) relative to the radius increases with increasing radius (r) at a rate greater than the increase in radius over at least a portion of the segment width (31), and
wherein the first edge (36) has at least two linear parts with different gradient.

2. An axial bearing arrangement (11) for a rotating shaft (10) which extends in an axial direction, comprising
a non-rotating axial bearing (3) having a bearing surface (24), having a plurality of surface segments (25) which are distributed along the circumferential direction and which project from or are recessed into the bearing surface (24) of the axial bearing (3) in the axial direction, and a run-on collar (12, 13) which is rotationally conjointly connected to the shaft (10), wherein the run-on collar (12, 13) comprises an annular load-bearing surface (15) for support on the segments (25) of the axial bearing, wherein the segments (25) are delimited, with respect to the direction of rotation of the rotating shaft (10) and run-on collar (12, 13), by in each case one first edge (36) and one second edge (37), wherein a segment length (35) is defined as an arc length between the first and second edges (36, 37) in the circumferential direction, wherein a radius (r) is defined perpendicular to the axial direction to the central point (34) of the shaft (10), and wherein each segment has a segment width (31) delimited by a radially inner edge and a radially outer edge, and wherein the segment length (35) relative to the radius increases with increasing radius (r) at a rate greater than the increase in radius over at least a portion of the segment width (31), wherein each segment (25) is formed from a rest surface (27) and a hydrodynamically acting wedge surface or stepped surface (26) positioned downstream, with respect to the direction of rotation of the rotating shaft (10) and run-on collar (12, 13), of said rest surface, wherein said wedge surface or stepped surface forms a narrowing lubrication gap which ensures the hydrodynamic load-bearing capacity of the axial bearing arrangement during operation, and wherein the segment length (35) is made up of a wedge length (32) of the wedge surface (26) and a rest length (33) of the rest surface (27), wherein the wedge length (32) increases with increasing radius (r).

3. The axial bearing arrangement as claimed in claim 2, wherein the rest surface (27) is arranged parallel to the load-bearing surface (15).

4. The axial bearing arrangement as claimed in claim 2, wherein the segment length (35) is made up of a wedge length (32) of the wedge surface (26) and a rest length (33) of the rest surface (27), wherein the wedge length (32) and also the rest length (33) increase with increasing radius (r).

5. An axial bearing arrangement (11) for a rotating shaft (10) which extends in an axial direction, comprising a non-rotating axial bearing (3) having a bearing surface (24), having a plurality of surface segments (25) which are distributed along the circumferential direction and which project from or are recessed into the bearing surface (24) of the axial bearing (3) in the axial direction, and a run-on collar (12, 13) which is rotationally conjointly connected to the shaft (10), wherein the run-on collar (12, 13) comprises an annular load-bearing surface (15) for support on the segments (25) of the axial bearing, wherein the segments (25) are delimited, with respect to the direction of rotation of the rotating shaft (10) and run-on collar (12, 13), by in each case one first edge (36) and one second edge (37), wherein a segment length (35) is defined as an arc length between the first and second edges (36, 37) in the circumferential direction, wherein a radius (r) is defined perpendicular to the axial direction to the central point (34) of the shaft (10), and wherein each segment has a segment width (31) delimited by a radially inner edge and a radially outer edge, and wherein the segment length (35) relative to the radius increases with increasing radius (r) at a rate greater than the increase in radius over at least a portion of the segment width (31), and wherein the first edge (36) has at least one first arcuate part and at least one second arcuate part, different from the first arcuate part.

6. A turbocharger (1), comprising at least one axial bearing arrangement (11) for a rotating shaft (10) which extends in an axial direction, the axial bearing arrangement (11) comprising a non-rotating axial bearing (3) having a bearing surface (24), having a plurality of surface segments (25) which are distributed along the circumferential direction and which project from or are recessed into the bearing surface (24) of the axial bearing (3) in the axial direction, and a run-on collar (12, 13) which is rotationally conjointly connected to the shaft (10), wherein the run-on collar (12, 13) comprises an annular load-bearing surface (15) for support on the segments (25) of the axial bearing, wherein the segments (25) are delimited, with respect to the direction of rotation of the rotating shaft (10) and run-on collar (12, 13), by in each case one first edge (36) and one second edge (37), wherein a segment length (35) is defined as an arc length between the first and second edges (36, 37) in the circumferential direction, wherein a radius (r) is defined perpendicular to the axial direction to the central point (34) of the shaft (10), and wherein each segment has a segment width (31) delimited by a radially inner edge and a radially outer edge, wherein the segment length (35) relative to the radius increases with increasing radius (r) at a rate greater than the increase in radius over at least a portion of the segment width (31), and wherein the first edge (36) has at least two steps.

7. The turbocharger as claimed in claim 6, wherein the turbocharger is an exhaust-gas turbocharger.

* * * * *